United States Patent [19]

Hehl

[11] 3,849,838

[45] Nov. 26, 1974

[54] DEVICES FOR FASTENING THE CASING OF A SEMICONDUCTOR COMPONENT TO A MOUNTING PLATE

[75] Inventor: Klaus Friedrich Hehl, Norderstedt, Germany

[73] Assignee: ITW-Ateco GmbH, Norderstedt, Germany

[22] Filed: Feb. 20, 1974

[21] Appl. No.: 444,194

Related U.S. Application Data

[62] Division of Ser. No. 333,200, Feb. 16, 1973, Pat. No. 3,833,991.

[52] U.S. Cl. ........... 24/73 C, 29/203 B, 317/101 C, 339/17 R

[51] Int. Cl. ...... A44b 21/00, H05k 3/30, H02b 1/04

[58] Field of Search .................. 317/101 C, 101 CC; 29/203 P, 203 B; 24/73 C, 73 B; 339/17 LC, 17 LM, 17 C, 17 CF, 17 R; 248/361 R, 73

[56] References Cited

UNITED STATES PATENTS

| | | | |
|---|---|---|---|
| 2,429,468 | 10/1947 | Ketchan | 248/361 R |
| 2,613,413 | 10/1952 | Budny | 24/10 R |
| 3,149,895 | 9/1964 | Bernstein | 339/17 C |
| 3,273,839 | 9/1966 | Bennett | 248/73 |
| 3,302,157 | 1/1967 | Olson | 339/17 R |
| 3,443,298 | 5/1969 | Romeo | 29/203 B |
| 3,707,108 | 12/1972 | Pabich | 317/101 CC UX |
| 3,768,064 | 10/1973 | Pabich | 24/221 R UX |

FOREIGN PATENTS OR APPLICATIONS

| | | | |
|---|---|---|---|
| 1,076,209 | 2/1960 | Germany | 317/101 C |
| 1,126,953 | 5/1962 | Germany | 317/101 C |

OTHER PUBLICATIONS

IBM Technical Disclosure Bulletin, Vol. 14, No. 1, June 1971, p. 182.

*Primary Examiner*—Donald A. Griffin
*Attorney, Agent, or Firm*—J. R. Halvorsen; Robert W. Beart

[57] ABSTRACT

A device for fastening the casing of a semiconductor component to a mounting plate and, in particular, to a cooling sheet, said device comprising a substantially U-shaped bow of resilient material the web of which is designed to press against the cap of a semiconductor casing and the bow being provided, at the ends of its legs, with hooks and the legs being arranged to be drawn through apertures in the mounting plate by means of said hooks which are bent off from the ends of the legs and which anchor the legs of the bow on the opposite side of the mounting plate from the side against which the said casing bears.

8 Claims, 16 Drawing Figures

XII - XII

XIII - XIII

DEVICES FOR FASTENING THE CASING OF A SEMICONDUCTOR COMPONENT TO A MOUNTING PLATE

This is a division of application Ser. No. 333,200 filed Feb. 16, 1973 and now Pat. No. 3,833,991 issued Sept. 10, 1973.

BACKGROUND OF THE INVENTION

The present invention relates to a device for fastening the casing of a semiconductor element to a mounting plate, and, in particular, to a metal cooling sheet.

Semiconductor components are used on a large scale, particularly in the radio and television industry. They are also used wherever electronic components are transistorized.

Semiconductor components are disposed in casings which are then, in turn, secured in position on mounting plates or cooling sheets of some kind. Cooling sheets are particularly used in cases where it is necessary to dissipate the heat occurring during operation of the semiconductor component, in such a way that the maximum temperature prescribed for operating purposes is not exceeded. The attachment of the casing must therefore be contrived in such a way that uniform contact of the bottom surface of the casing against the surface of the cooling sheet is guaranteed. It is also necessary to make sure that the attachment of the casing to the cooling sheet does not bring about any electrical connection between these two parts.

The casings of transistors which give off fairly large quantities of heat, in particular power transistors, generally consist of a base plate on to which a casing cap is welded. The semiconductor component is then disposed in the space between the base plate and the interior of the cap. In some types of casing, the base plate is oval in shape and is provided, on both sides of the cap, with bores in the region of the longer axis.

The attachment of casings of this kind to cooling sheets involves extremely high labour costs. In order to comply with the requirements in respect of insulation and adequate attachment, together with satisfactory transmission of heat, the casing is secured with the aid of two screws, two plastics bushes, two toothed washers and two nuts. Under these circumstances, the assembly procedure is as follows: plastics bushes provided with flanges are first inserted in apertures in the cooling sheet, from the rear of the latter. A mica plate, which corresponds to the surface of the base plate of the casing, is then placed on the cooling sheet, over the bushes which project through the apertures. After this, screws, which engage through the mica plate and the plastics bushes, are passed through the bores in the base plate of the casing. Toothed washers are then placed on the ends of the screws which project from the bushes, and finally nuts are screwed on and the screwed connections tightened with the aid of a screwdriver.

This known method of attaching power transistors to cooling sheets is uneconomical because of the large number of individual parts required and of the highly expensive assembly operation. In addition, it may come about that the base plate of the casing becomes buckled in the middle in the case of the known method of attachment, as a result of which optimum conducting-away of heat is no longer guaranteed. In fact, the air gap which is formed in the event of the base plate buckling, gives rise to thermal insulation.

SUMMARY OF THE INVENTION

The object of the present invention is to provide a device for fastening the casing of a semiconductor component to a mounting plate, which device is simple to assemble and eliminates the danger of the base plate buckling.

In a device of the type initially mentioned, the problem posed is solved, according to the invention, through a resilient bow which presses against the casing cap with its base part and the spring legs of which are drawn through apertures in the mounting plate by means of hooks which are bent off from the ends of the legs and which anchor the spring legs on the opposite side of the plate from the side against which the casing bears.

A large number of fastening parts, such as the use of two screws, two spring washers and two nuts, is thus replaced by the resilient bow which represents a complete fastening element. The resilient bow presses against the cap of the casing with its base part. In this way, attachment of the casing is effected centrally, and bending in the middle is not possible.

According to a further development of the invention, the resilient bow is underlaid with a strip of insulating material, to which there are attached bushes which insulate the walls of the apertures from the spring legs. In this case, therefore, the separate assembly of individual plastics bushes is also eliminated. The plastics bushes themselves constitute part of the insulating piece which underlays the resilient bow.

According to a further development of the invention, upright limiting strips are provided along the edges of the strip of insulating material, on that side which faces towards the resilient bow. These upright limiting strips prevent the resilient bow from falling off at the sides.

The resilient bow may, according to a further development of the invention, consist either of steel wire or of a strip of steel sheet. The choice of material depends upon the circumstances prevailing.

According to a further development of the invention, the insulating pieces consisting of strips of insulating material and bushes, are plastics injection-mouldings. The manufacture of the insulating pieces is therefore arranged in an extremely simple manner. Above all, however, it is also possible, according to a further development of the invention, for a plurality of insulating pieces to be joined together via seperating webs. In the event of a plurality of insulating pieces being jointly injection-moulded, therefore, bars of insulating pieces are produced, from which it is possible to cut off individual insulating pieces in a fitting machine. Naturally, it is also possible, according to a further development of the invention, to provide the separating webs with a dovetail-type plug connection. With mutual displacement of adjacently disposed insulating pieces, perpendicularly to their common, main plane, the insulating pieces can then be detached from one another without separation of the webs.

A considerable simplification of assembly is achieved through the fact that the resilient bows are already pre-assembled through the pushing-on of insulating pieces. This pre-assembly is readily possible since the resilient bows are securely held on the insulating pieces because of the ends of their spring legs, which are bent over in the form of hooks.

A device for fastening the casings of components to mounting plates, and in particular, cooling sheets, may then be so constructed, according to a further development of the invention, that mounting plates and casings which are held fixedly against one another, in the position of attachment, on a fitting table, are conducted past under a fastening station, and that, in the fastening station, fastening devices, which are held in readiness in a magazine, are pre-assembled, and consist of resilient bows and insulating pieces, are pushed over the casings and anchored on the mounting plates. This device naturally presupposes that the insulating pieces are already fitted with resilient bows. However, this is possible without any difficulty, since even the insulating pieces fitted with resilient bows can easily be held in reserve in magazines.

According to a further development of the invention, the table on which final assembly occurs may be either elongated or round. In the case of an elongated table, an intermittent-type conveyor track will be preferred, whereas the round table will be a rotating table.

BRIEF DESCRIPTION OF THE DRAWINGS

The invention will be explained in greater detail, by way of example, with reference to the accompanying drawings, in which.

DESCRIPTION OF PREFERRED EMBODIMENTS

Figures 1, 2, 3, 4, 5, 6, 7, 8:
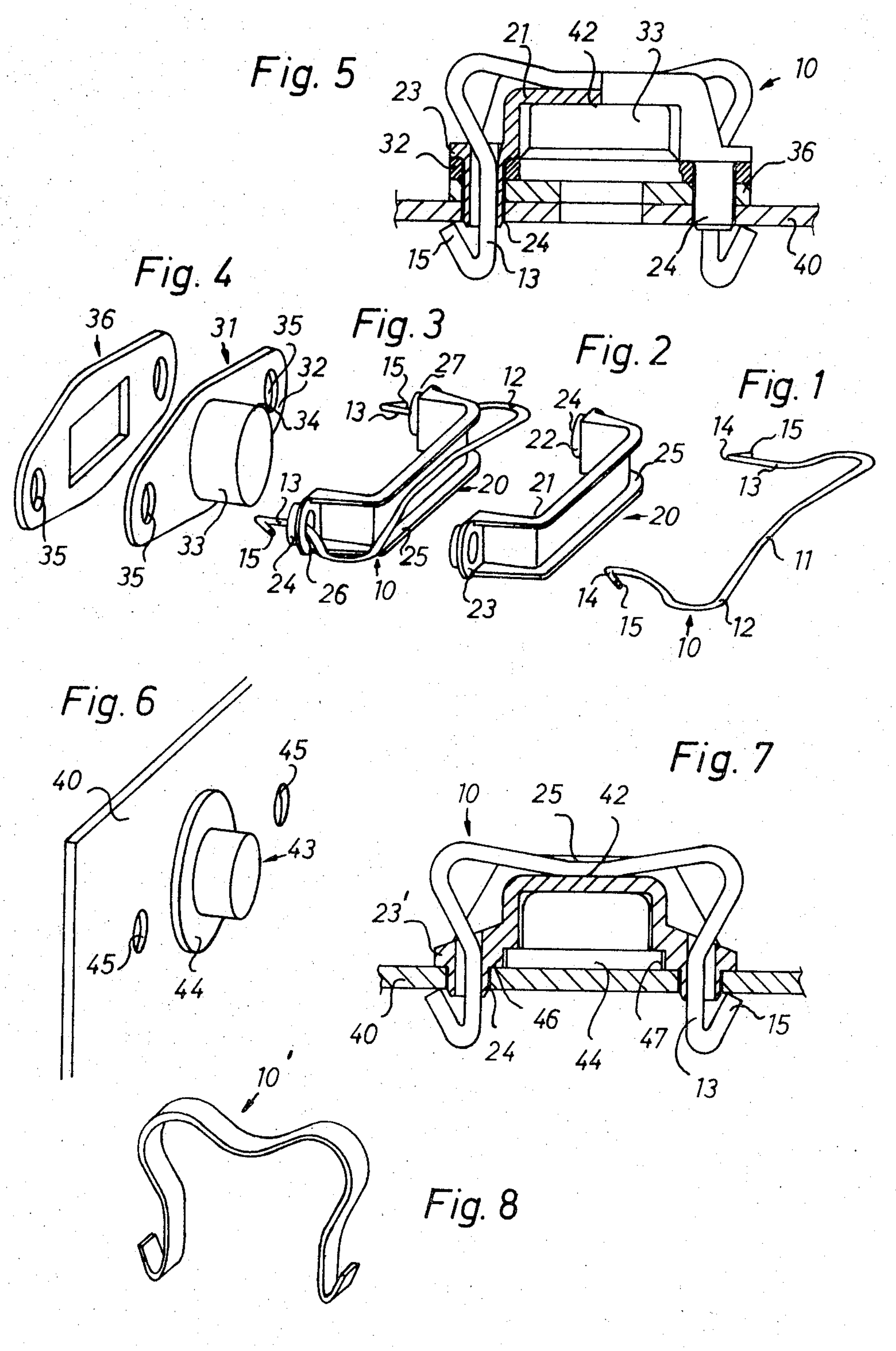
FIG. 1 shows one embodiment of a resilient bow belonging to the fastening device according to the invention.
FIG. 2 shows an insulating piece for the resilient bow in FIG. 1.
FIG. 3 is an assembly unit consisting of the resilient bow and insulating piece.
FIG. 4 illustrates, diagrammatically, the casing of a semiconductor component together with an associated, insulating mica plate.
FIG. 5 is a section through the fastening device in the attached condition.
FIG. 6 shows, diagrammatically, the casing of a semiconductor component of different construction, in front of a cooling sheet.
FIG. 7 shows, in section, the device according to the invention, with the casing in FIG. 6 in the attached position.
FIG. 8 shows a resilient bow according to the invention, which is formed from strip-shaped material.

The resilient bow 10 illustrated in FIG. 1 preferably consists of a spring-steel wire. The spring-steel wire is bent in a substantially U-shaped manner. This bow comprises a basic part 11, to which spring legs 13 are joined via curved portions 12. The spring legs 13, which at the same time constitute the sides of the U-shaped resilient bow, are bent round towards the outside at their ends 14, so that the ends 15 extend backwards alongside the spring legs 13, while diverging slightly from the latter. The base 11 of the resilient bow 10 is bent slightly in the direction of the interior of the U.

FIG. 2 illustrates an insulating piece 20, which is likewise bent in a substantially U-shaped manner and consists of a strip 21 of insulating material. Insulating bushes 24 are provided with flanges 23 by means of which the bushes are attached to the ends 22 of the sides of the U-shaped strip 21. In addition, limiting strips 25 are provided along the edges of the strip 21 of insulating material, and stand upright on the outer side of the said U-shaped strip.

FIG. 3 shows how the device according to the invention can be pre-assembled. The wire bow 10 is pushed through bores 26 in the bushes 24. Under these circumstances, the spring legs 13 extend through the bushes 24, and the hook-shaped ends 15 of the spring legs 13 spread out, away from the said spring legs 13. If an attempt were now made to pull the resilient bow 10 out of the insulating piece 20 again, the hook-shaped ends 15 would prevent this by running up on the outside 27 of the bushes 24. The resilient bow 10 is thus held on the insulating piece 20 in a non-losable manner. The upright edge strips 25 prevent it from being slid off at the sides.

FIG. 4 shows, in an exploded view and one behind the other, a semiconductor component provided with a casing 31. The casing 31 consists of a base plate 32 of approximately oval shape. A casing cap 33 is seated on this base plate 32. On the longer diameter 34 of the base plate 32, fastening bores 35 are provided on both sides of the cap 33.

Matching the base plate 32, a mica plate 36 is provided which has the same shape as the base plate 32 and is likewise provided with bores 35. An earthing plate (not shown) may also be disposed between the mica plate 36 and the base plate 32 of the casing 31.

FIG. 5 shows a side view of the casing 31, which is mounted on a cooling sheet 40. In this Figure, the fastening device consisting of the wire bow 10 and the insulating piece 20 is shown in partly cut-away form. On the cooling sheet 40, there is first of all located the mica plate 36, against which the base plate 32 of the casing 31 is then placed. The insulating strip 21 encompasses the cap 33 of the casing 31. The flange plates 23 of the bushes 24 rest on the base plate 32, and the bushes 24 extend through the bores 35 in the base plate and mica plate, and also through corresponding bores in the cooling sheet 40.

The inwardly curved part of the resilient bow 10 presses approximately against the centre of the bottom 42 of the cap. The spring legs 13 extend through the bushes 24 and the ends 15, which are bent over in the form of hooks, press against the underside of the cooling sheet 40. If a suitable shape is imparted to the resilient bow 10, the force with which the latter presses the casing 31 against the cooling sheet 40 is sufficiently great to bring about satisfactory and uniform thermal contact. In this case, the uniform thermal contact is promoted through the fact that the central, indented part of the resilient bow presses against the centre of the cap 33.

In the fastening device, two forces act against one another. One force is that which is exerted upon the cap 33 by means of the resilient bow 10, and the opposing force is that with which the ends 15 which are bent over in the form of hooks press against the cooling sheet 40 from the other side. There is therefore a certain initial tension in the resilient bow 10 as soon as the latter is assembled, and this intiial tension guarantees the secure attachment of the casing 31 to the cooling sheet 40.

With the aid of the insulating piece 20, the resilient bow is completely insulated from the casing 31, from the electrical point of view. The resilient bow rests on the cap 33 with the interposition of the insulating piece and is therefore insulated from the cap at this point. The spring legs 13 engage through the bushes 24, and can therefore likewise give rise to no metal-to-metal contact with the base plate 32 or casing 31. Only the bent-over, hook-shaped ends 15 of the spring legs 13 press against the cooling sheet.

Naturally, the word "cooling sheet" ought not to be taken literally. Instead of a cooling plate, use may also be made, as the fastening plate, of a chassis panel or any other, preferably metal, component of a piece of equipment.

In the casing 43 of a semiconductor component shown in FIG. 6, the base plate 44 is of circular construction, and has no fastening holes. In order, for example, to be able to fasten a casing 43 of this kind to a cooling sheet 40, the latter is provided with apertures 45.

FIG. 7 shows how, with the aid of the device according to the invention, even the casing 43 can be secured to a cooling sheet 40. The resilient bow 10 may again be of the same design as is shown in FIG. 1. It consists of a base part 11 and spring legs 13, the hook-shaped ends 15 of which are bent backwards. The insulating piece 20 is slightly modified in relation to that shown in FIG. 2. The flanges 23' are, in fact, extended in such a way that they form an inner edge 46 which fixes the outer edge 47 of the base plate 44 in position. Upright limiting strips 25 again prevent the bow 10 from falling off at the sides.

FIG. 8 illustrates another form of construction of a resilient bow. In this case, the resilient bow does not consist of a shaped resilient wire, but of a spring-steel strip. Otherwise, the shape imparted to this resilient bow 10' corresponds to that imparted to the resilient bow shown in FIG. 1.

Figure 9:
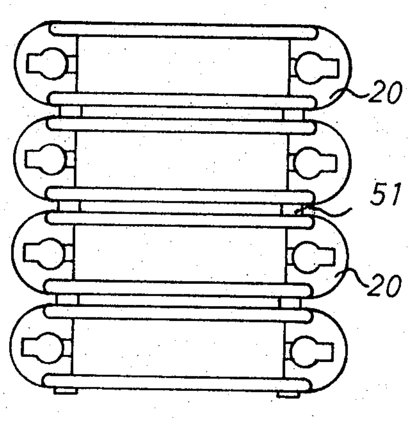
FIG. 9 shows insulating pieces according to the invention, which are joined together with the aid of separating webs.

In order to enable the attachment of semiconductor components to mounting plates to be mechanized to the greatest possible extent, it is expedient if the fastening devices according to the invention are not used as individual parts, but are instead kept in stock in the form of chains. According to a form of construction of the invention which is shown in FIG. 9, individual insulating pieces 20 are joined together by means of separating webs 51. These separating webs 51 can be formed during the injection-moulding of insulating pieces in bars. The webs are simply severed during a subsequent assembly operation, as a result of which an individual insulating piece can be released for assembly.

In the example of construction shown in FIG. 9, the separating webs 51 are provided between the insulating pieces 20. Naturally, it is also possible to dispose these separating webs at the sides, and to join them together by means of a lateral strip.

Figure 10:
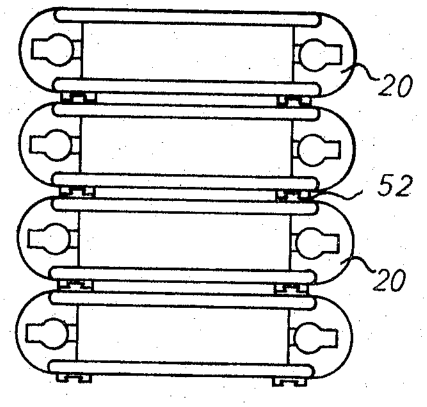
FIG. 10 shows insulating pieces which are joined together via webs having dovetail-shaped plug connections.

A further form of construction of separating webs is illustrated in FIG. 10. In this case, the separating webs are provided with alternate dovetail guides 52. These alternate dovetail guides 52 make it possible for the individual insulating pieces 20 to be assembled to form chains. The dovetail guides are preferably located between the insulating pieces 20, which are disposed parallel to one another.

Figure 11:
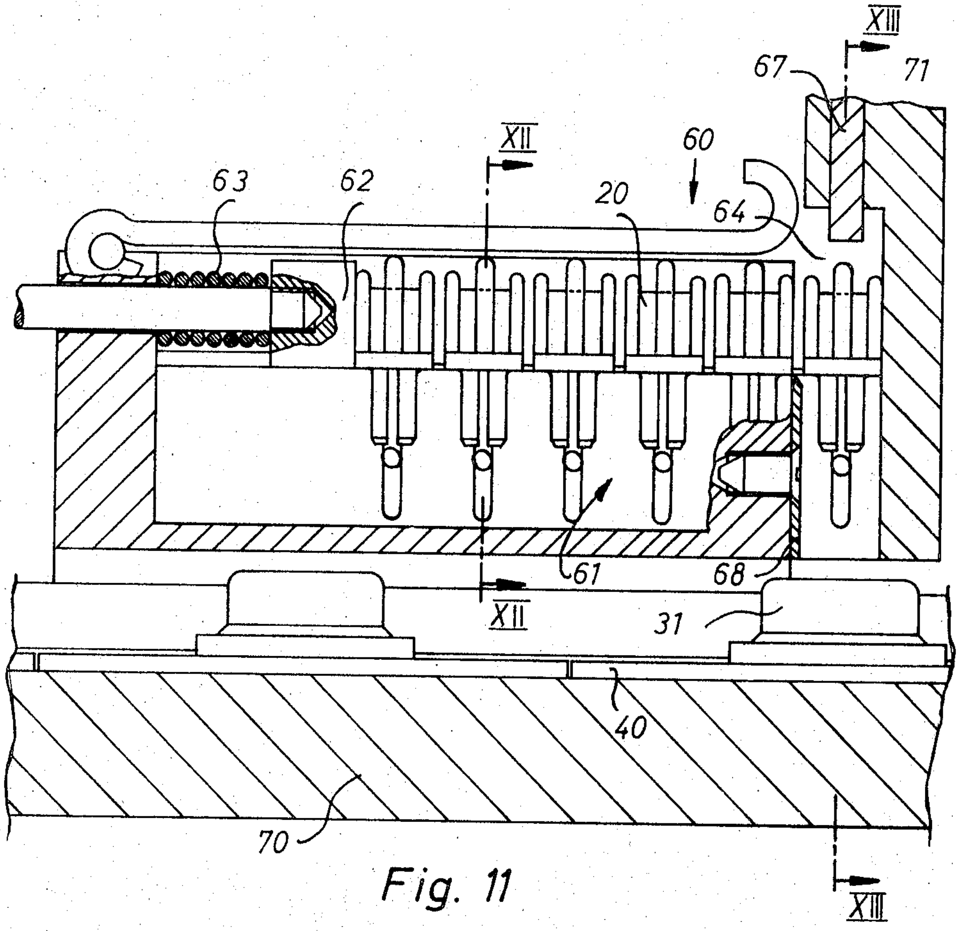
FIG. 11 shows a partial section through a device for pressing fastening devices according to the invention on to the casings of semiconductor components.

It is preferred that the fastening devices according to the invention should come pre-assembled ready for use, that is to say, with the resilient bows pre-mounted on the insulating pieces. In the device 60 according to the invention which is illustrated in FIG. 11, chains of insulating pieces, which have been pre-assembled in this manner, come in a magazine 61. In the said magazine 61, the insulating pieces 20 are pushed towards a delivery guide 64 by means of a thrust piece 62 and a spring 63.

Figure 12:
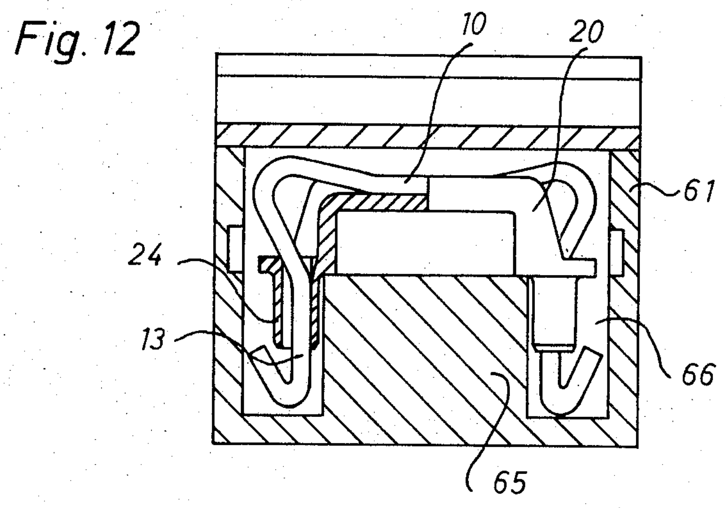
FIG. 12 is a section along the line XII—XII in FIG. 11.

As shown in FIG. 12, the insulating pieces 20 run along on a rail 65, and the bushes 24 and the spring legs 13 are freely displaceable in grooves 66 in the magazine.

During the delivery of the chains of insulating pieces towards the delivery guide 64, one insulating piece 20 always passes into this delivery guide. The pre-assembled insulating piece can then be driven out in the downward direction with the aid of a ram 67 reciprocably mounted in a guide 71, the separating webs 51 being cut through by means of a knife 68.

Figure 13:
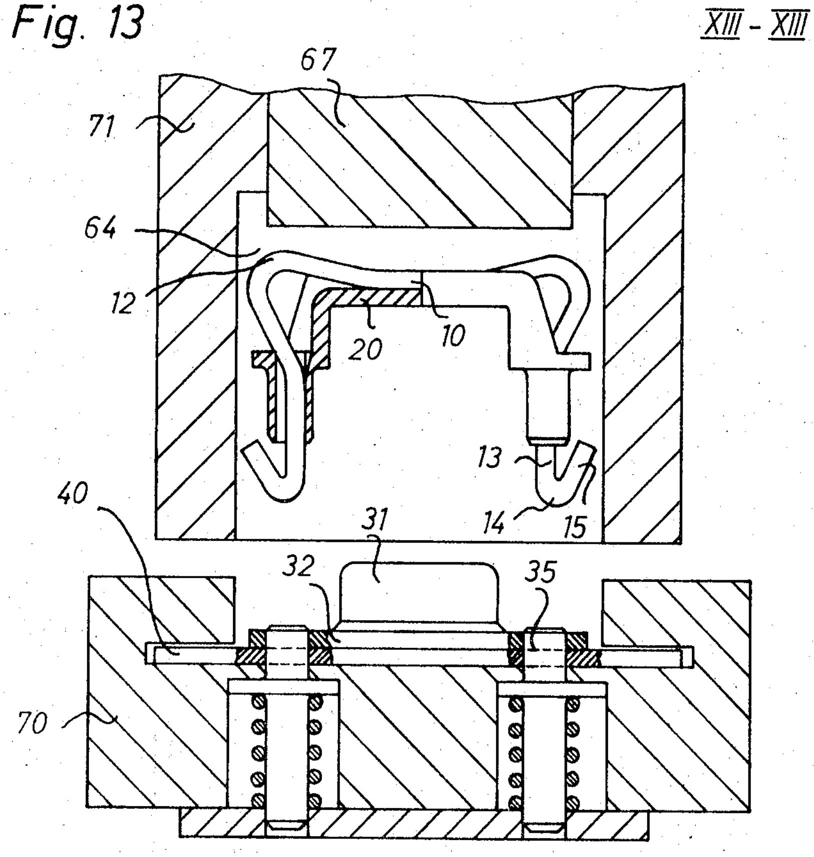
FIG. 13 is a section, along the line XIII—XIII, through the device shown in FIG. 11.

Semiconductor components which are to be fastened to cooling sheets 40 or other mounting plates, can be brought up, in their casings 31, 43, to the delivery guide on a table 70 beneath the magazine 61 and the ram guide 71. During the downward passage of the ram 67, which can be seen particularly clearly from FIG. 13, the ends 14 of the spring legs 13 travel precisely towards the holes 35 in the casing under the cooling sheet 40. Under these conditions, the ends 15 which are bent over in the form of hooks, are first pressed back against the spring legs 13 and then, after passing through the base plate 32 and the cooling sheet 40, spring out sideways again, so as to then bring about the desired security. As resistance occurs during the downward travel of the insulating piece 20 and of the resilient bow 10, the ram 67 presses predominantly against the curved portions 12 of the resilient bow. The result of this is that the spring legs pivot towards one another at their lower ends, and thus facilitate insertion in the holes 35.

Figures 14, 15:
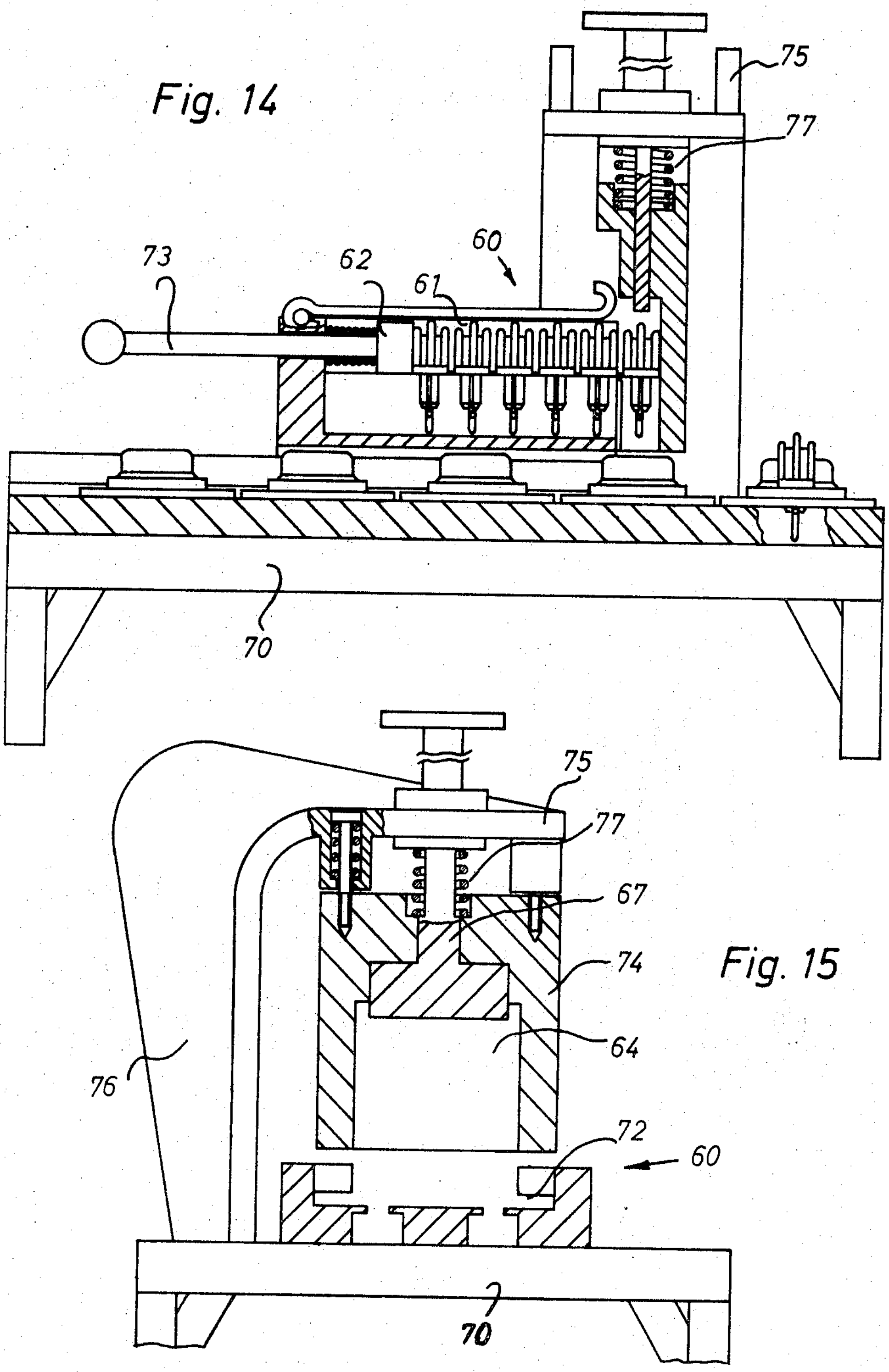
FIG. 14 is an overall view of a fastening device.
FIG. 15 is a side view of the device shown in FIG. 14.

FIGS. 14 and 15 show the entire device 60, with which the fastening devices according to the invention can be pressed on to casings with underlaid cooling plates. The table 70 may consist of a sliding table on which trays with inserted cooling sheets and casings placed on the latter, can be pushed along. In the drawing, the cooling sheets 40 are pushed onwards in a guide 72. The thrust piece 62 of the magazine 61 may be retractable with the aid of a bar 73, so that a new chain of fastening devices can be inserted in the magazine 61.

The ram 67 is guided, on the one hand, in a guide piece 74 which forms the delivery guide 64 and, on the other hand, in an outrigger 75 on a supporting arm 76 attached to the table 70. A return spring 77 ensures that the ram 67 always travels back, in the upward direction, into its starting position.

Figure 16:
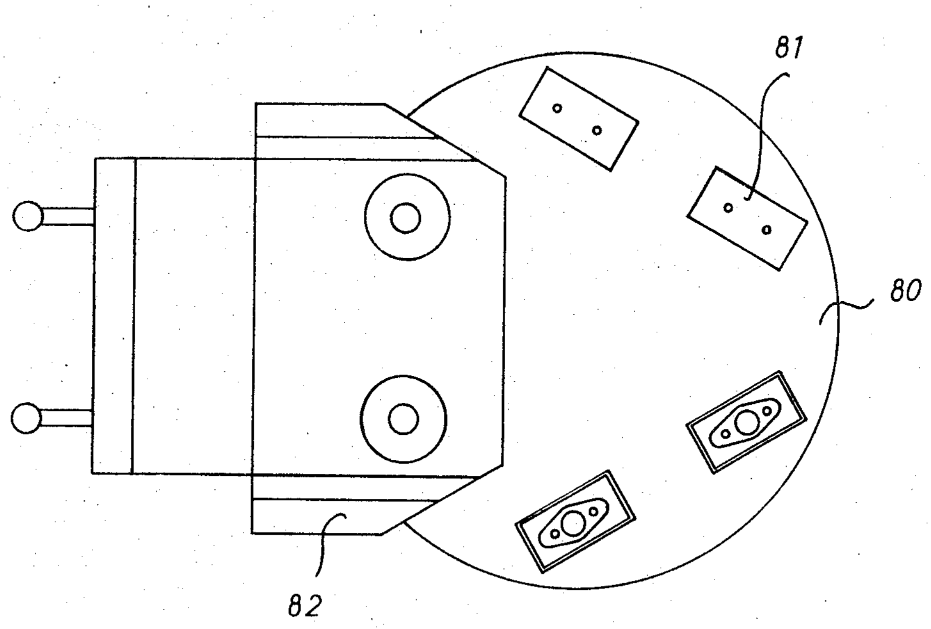
FIG. 16 is a rotating table for feeding the device shown in FIGS. 14 and 15.

In accordance with the form of construction shown in FIG. 16, it is also possible for the table 70, with its rectilinear guide 72 for cooling sheets 40, to be replaced by a rotating table. A plurality of insertion depressions 81 for cooling sheets 40 are provided on this rotating table 80, distributed along the edge of the latter. A cooling sheet is first placed in these insertion depressions, and a casing 31 or 43 is then placed on the said cooling sheet. The table is then rotated until the units placed on the table in this way pass into a processing station 82, in which the cooling sheet and casing are situated beneath the ram 67. As a result of the downward passage of the ram, the casing is then fastened to the cooling sheet with the aid of the fastening device according to the invention and, with further rotation of the table 80, the units, which are then in the finish-assembled state, pass out of the processing region again and can be removed from the table. The corresponding depressions thus become vacant again, and can be refilled.

The possibilities of the invention are not exhausted in the examples of construction which have been described above in detail. Forms of construction which differ from the concept of the invention but which put the said concept into practice, are also covered by the invention as defined by the appended claims.

What is claimed is:

1. A device for fastening the casing of a semiconductor component to an apertured mounting place and, in particular, to a cooling sheet, said device comprising a substantially U-shaped bow of resilient material the web of which is designed to press against the cap of a semiconductor casing, said bow being provided at the free ends of its legs with reversely bent hooks, said legs being arranged to be drawn through apertures in said mounting plate by means of said reversely bent hooks which will anchor the legs of said bow on the opposite side of said mounting plate from the side against which the said casing bears, and an insulating member having a strip portion underlying said resilient bow and bushing members associated with said strip which are adapted to project through said apertures and insulate the walls of said apertures from the legs of said bow.

2. A device as claimed in claim 1, in which the resilient bow consists of steel wire.

3. A device as claimed in claim 1, in which the resilient bow consists of a strip of steel sheet.

4. A device as claimed in claim 1, in which upright limiting strips are provided along the edges of the strip of insulating material, on that side which faces towards the resilient bow.

5. A device as claimed in claim 1, in which the strips of insulating material and bushes are plastics injection-mouldings.

6. A device as claimed in claim 1, in which a plurality of strips of insulating material are joined together by means of separating webs.

7. A device as claimed in claim 6, in which said separating webs are provided with a dovetail plug connection.

8. A device as claimed in claim 1, in which the resilient bows are pre-assembled by the pushing-on of strips of insulating material.

* * * * *